United States Patent [19]

Davies

[11] Patent Number: 4,592,782

[45] Date of Patent: Jun. 3, 1986

[54] COMPOSITION OF MATTER INCORPORATING POLYETHER ETHER KETONE

[75] Inventor: Glyndwr J. Davies, Uxbridge, England

[73] Assignee: AE PLC, Warwickshire, England

[21] Appl. No.: 588,386

[22] Filed: Mar. 12, 1984

[30] Foreign Application Priority Data

Mar. 14, 1983 [GB] United Kingdom ............... 8306989

[51] Int. Cl.$^4$ .............................................. B22F 1/00
[52] U.S. Cl. ....................... 75/253; 252/12; 75/252; 525/934; 525/185; 524/440
[58] Field of Search ................. 252/12; 524/440; 525/185, 934; 521/919; 75/252, 253

[56] References Cited

U.S. PATENT DOCUMENTS

| | | | |
|---|---|---|---|
| 4,000,982 | 1/1977 | Ueda | 252/12 |
| 4,064,097 | 12/1977 | Korshak et al. | 524/440 |
| 4,294,712 | 10/1981 | Ueno et al. | 252/12 |
| 4,367,189 | 1/1983 | Davies | 264/137 |
| 4,380,523 | 4/1983 | Lind et al. | 264/257 |
| 4,408,007 | 10/1983 | Kuhls et al. | 524/546 |
| 4,421,588 | 12/1983 | Davies | 156/308.2 |
| 4,429,078 | 1/1984 | Cogswell et al. | 525/165 |
| 4,465,799 | 8/1984 | Platkiewicz et al. | 523/457 |

FOREIGN PATENT DOCUMENTS

| | | | |
|---|---|---|---|
| 2108983 | 5/1983 | United Kingdom . | |
| 2123430 | 2/1984 | United Kingdom | 524/440 |

*Primary Examiner*—John F. Terapane
*Assistant Examiner*—Anne Brookes
*Attorney, Agent, or Firm*—Price, Heneveld, Huizenga & Cooper

[57] ABSTRACT

A plain bearing comprising a steel backing, a sintered bronze interlayer and a lining of a material consisting of polyether ether ketone, polytetrafluoroethylene, graphite and bronze.

6 Claims, No Drawings

COMPOSITION OF MATTER INCORPORATING POLYETHER ETHER KETONE

BACKGROUND OF THE INVENTION

Polyether ether ketone is a compound which is known to have properties which make it suitable for many applications. It is relatively chemically inert, has a very high fatigue strength and has a low coefficient of friction.

One application for which PEEK has been suggested is as a plain bearing material. However, when running under conditions of high speed with thin oil films, PEEK has been observed to suffer extreme temperature rises resulting in failure of the bearing, both alone and with various additives.

SUMMARY OF THE INVENTION

It is an object of the present invention to provide a composition of matter having a good chemical resistance and a fatigue strength comparable to that of PEEK but having an improved compatibility and coefficient of friction.

According to the invention, a composition of matter comprises a mixture of polyether ketone together with polytetrafluoroethylene (PTFE), graphite and bronze. Preferably the polyether ketone is polyether ether ketone (PEEK).

Preferably the bronze is a tin bronze, for example an 11% tin bronze.

Preferably the PEEK represents from 60% to 90% of the composition by weight, for example 70% to 85% by weight and most preferably 80% by weight. Preferably, the weight ratios of the remaining compounds are 1:3:4: for graphite:PTFE:bronze. Thus, in the most preferred composition there would be 2.5% graphite, 7.5% PTFE and 10% bronze by weight.

When used as a bearing material, such a composition may show a fatigue strength comparable to that of PEEK alone (i.e. higher than other polymeric bearing materials) together with a lower coefficient of friction. The material also tends to show a lower wear rate under water and with grease and oil lubrication.

The melting temperature of the material may be in excess of 330° C.; the maximum continuous working temperature recommended is 250° C. although temperatures up to 300° C. can be tolerated for short periods. With conventional oils and greases the working temperature of the system will be limited to below 200° C. by the thermal stability of the lubricant. Synthetic lubricants may therefore be required to exploit fully the high temperature potential.

The material appears to be compatible with all the common lubricants and degreasing fluids. Unlike bearings based on acetal resins, the material of the invention is not degraded by acidity produced in hydrocarbon oils used above 80° C. nor by shock absorber oils or by polyglycol or diester lubricants. It is also suitable for use in hot water or oil/water emulsions.

The composition may be made by any convenient method for example powder mixing or compounding followed by extrusion. The extruded mixture can be subsequently pelleted and comminuted and/or extruded prior to use.

In a preferred method of producing a tape of the material, the constituents are mixed and compounded and then extruded as strands. These are dried and chopped into pellets which are in turn extruded as a tape. However, it may also be possible to mix and compound the constituents and to extrude the tape directly.

The composition may be moulded for use as a bearing or may be applied as a lining to a backing for example of metal, preferably steel or aluminium. The composition may be applied to the backing as a powder or a tape and is preferably roll bonded. An interlayer for example of tin or aluminium bronze is preferably applied to the backing prior to the application of the composition. The tin bronze may be sintered to the backing and the aluminium bronze may be arc sprayed to the backing.

Lining thicknesses above the bronze in the range 0.5–0.1 mm can be made. The bearing surface can be made with indentations, to provide lubricant reservoirs, or plain.

In a particular method of producing a composition in accordance with the invention the composition is pulled from an extruder by haul-off rolls. This tends to cause fibration of the extrudate, which increases as the draw-down ratio increases (the draw-down ratio is the ratio of the haul-off rate to the natural extrusion rate). When made in this way, the composition tends to comprise drawn fibres of PEEK matted and fused together, having a void content in the range 10 to 70%. The PTFE tends largely to be present as particles adhering to the surface of the PEEK fibres.

If the feed rate of the fine component powders is kept deliberately low, a large volume of small air pockets may be entrained in the melt. The small particle size of the PEEK and the de-wetting effect of the PTFE powder may assist in producing a finely porous melt at the extrusion die lips. Thus, when this is drawn as it emerges, a multitude of separate fine fibres may be formed, assisted by the de-wetting effect of the PTFE. This effect may be enhanced by adding a volatile agent which "boils" as the material leaves the die. Any suitable inert material having a boiling point less than about 350° C. may be used, e.g. water, benzyl benzoate, diphenyl ether etc.

When this porous material is used as a bearing material, the porosity can provide a reservoir for oil or grease within the material, thus providing a continuous lubricant supply. At the same time, the material may still exhibit high mechanical strength and wear resistance, even with high porosity, because of the very high strength of the drawn PEEK fibres and the fact that they are fused together in the matrix.

If it is desired to produce a non-porous tape then it is necessary to eliminate the voids entrained in the melt. This may be carried out by applying a low pressure at some stage (e.g. compounding) prior to the final extrusion to remove any volatile matter. The material so produced is a dark non-porous tape which does not exhibit fibration.

To produce a plain bearing, a lining of the material according to the invention is preferably bonded to a steel backing by way of a sintered bronze interlayer. The backing, to which the interlayer has been applied is passed between two cooled rollers together with a tape of the material according to the invention. The temperature of the backing melts the tape locally and this is forced into the interstices of the sinter. The composite is cooled immediately to form a strong bond between backing and lining.

The material in accordance with the invention can also provide linings of increased thickness e.g. up to 4 mm. When this is to be applied as a lining to a correspondingly thick backing, again preferably by way of a sintered bronze interlayer, there may be a tendency for the lining to peel off if applied by a cold rolling method, since the backing may retain more heat than can be removed immediately after rolling so that the lining may not freeze effectively at the interface while stresses may be set up at the opposite face of the lining due to the pressure and the temperature gradient across the thickness of the lining. This may tend to cause the lining to curl away from the backing. Thus, for large bearings the lining may be applied to the backing as a powder in one or more stages, or more preferably by placing a layer of lining on to the sintered backing and by applying heat and pressure and then allowing the composite to cool under pressure. A stack of two or more composite strips, one above the other can be formed in this way, though a separator may be required between adjacent strips.

It is believed that the most satisfactory results may be obtained when the PTFE, graphite and bronze are combined into a powder mixture prior to being added to the PEEK, at least when the material is to be used as a bearing lining operating without oil lubrication. This may be due to a phenomenon known as the PTFE transfer film, in which a film of PTFE is believed to transfer from the lining to the counterface. The presence of copper in the bronze may enhance the transfer film bond to the counterface and possibly this effect is improved when the copper is in more intimate proximity to the PTFE particles.

Table 1 shows the preferred range of the compounds in the composition according to the invention.

TABLE 1

|  |  | Wt % | | Vol % | |
| --- | --- | --- | --- | --- | --- |
|  |  | Max | Min | Max | Min |
|  | PEEK | 90.0 | 60.0 | 95.7 | 79.0 |
| VX2 | PTFE | 3.7 | 15.0 | 2.5 | 15.5 |
|  | GRAPHITE (natural) | 1.3 | 5.0 | 0.9 | 4.2 |
|  | BRONZE | 5.0 | 20.0 | 0.9 | 4.2 |

Range = 10% to 40% VX2 by weight

Table 2 shows the most preferred composition according to the invention, designated HX.

TABLE 2

|  |  | Wt % | | Vol % |
| --- | --- | --- | --- | --- |
|  | PEEK |  | 8.0 | 91.0 |
|  | PTFE |  | 7.5 | 5.4 |
| VX2 | GRAPHITE (Natural) | 20 | 2.5  9.0 | 1.8 |
|  | BRONZE (11% Sn) |  | 10.0 | 1.8 |

Although the compositions have been described as including polyether ether ketone, any suitable polyether ketone may be used in its place.

In order to illustrate the improved properties of bearings using a material in accordance with the invention as a lining various tests have been carried out to examine wear rate, and fatigue strength.

Considering firstly wear resistance, a material designated HX shown in Table 2 was compared with known bearing materials.

Bushes of 16 mm (⅝″) diameter were used with a steady load at room temperature. The mating shaft was mild steel, ground to a surface finish of 0.2 micrometers CLA (8 micro inches CLA). The bushes were packed with lithium based grease and run at 500 rev/min at 25.6 kg load, a PV factor of 0.7 N/mm²×m/s (20,000 psi×ft.min) for 500 hrs or until wear exceeded 0.25 mm or seizure occurred for the comparative materials. In order to obtain measurable wear rates in a reasonable time, the PV was doubled in the case of HX (for HV, PV=1.4 N/mm²×m/s (40,000 psi×ft/min), and the tests continued for 3000 hrs.

The results are shown in Table 3.

TABLE 3

| Bearing Material | Duration (test (hrs) | PV N/mm² xm/s | Average Wear Rate | |
| --- | --- | --- | --- | --- |
|  |  |  | μm/ 100 hr | 0.001″/ 100 hrs |
| HX | 3000 | 1.4 | 0.8 | 0.03 |
| Acetyl Copolymer | 500 | 0.7 | 0.8 | 0.03 |
| Sintered 22% lead-bronze steel backed | 330 | 0.7 | 4.0 | 0.15 |
| Cast 10% lead steel backed | 500 | 0.7 | 12.0 | 0.5 |
| Steel backed lead-bronze with graphite filled indents | 42 | 0.7 | 800 | 30 |
| Tin based whitemetal | 15 | 0.7 | 900 | 35 |
| Phosphor-bronze | 2 | 0.7 | seized | seized |

It can be seen from Table 3 that HX is considerably more resistant to wear than all the other materials, with the possible exception of the acetyl copolymer, though even in this case it may be assumed that the wear resistance HX was twice as good since the load applied to the HX was double that to which the acetyl copolymer was subjected. Furthermore, the HX would be even more effective than the acetyl co-polymer at high temperatures due to its chemical inertness and high melting point.

In order to examine the performance of HX without oil lubrication, the material was subjected to water lubricated conditions.

Bush tests (16 mm bore, 19 mm long) running submerged in water at 500 rev/min, 25.6 Kg load (PV=0.35 N/mm²×m/sec) gave an average wear rate of 1.0 μm/100 hr giving lives in excess of 10,000 hr (depending on lining thickness). Thus, even in non-oil lubricated conditions, HX shows a very high wear resistance.

Considering now fatigue strength. HX was tested on a rig which simulates the dynamic loadings applied to the crankshaft bearings of reciprocating internal combustion engines. The materials tested were assessed by the peak specific load which caused lining fatigue during a 20 hour running period. Oil supply temperature during these tests was approximately 60° C. The results obtained are summarised in Table 4.

TABLE 4

| Material | Fatigue Rating (N/mm²) |
| --- | --- |
| Tin based white metal | 40 |
| Reticular 20% tin-aluminium | 100 |
| HX | 100 |
| Lead bronze (10% Sn 10% Pb) | 130+ |

Thus, it can be seen that the fatigue strength of HX is comparable with very durable existing materials.

The invention may be carried into practice in various ways as illustrated in the following non-limiting examples.

DESCRIPTION OF THE PREFERRED EMBODIMENTS

Example 1

The poly ether ether ketone, obtained from ICI as VICTREX PEEK, Grade 45G was compounded with a 20% by volume graphite 20% by volume bronze filled PTFE moulding powder obtained from ICI as FLUON VX2 in the proportions 20% wt VX2 to 80% wt PEEK.

The mixture was compounded together in the melt phase using a conventional melt extrusion apparatus. Under these conditions, the temperature is maintained between 360° and 390° C. at which the PEEK is molten and the PTFE is quite viscous. The resulting blend was extruded into the form of a strand which upon solidification was broken up into granules. The granules were extruded again into continuous tape 15 cm wide, 250 microns thick.

The tape produced was of an even homogenous grey appearance with no porosity and a density of 1.55 g/cm$^3$.

The tape was then bonded firmly to 1½ mm thick steel strip via a 0.5 mm porous tin bronze interlayer acting as a mechanical key. The backing strip is made in the form of continuous copper plated steel strip with bronze powder sintered onto one side. This backing strip was preheated to 360° to 380° C. by passing through an induction heating coil and with the polymer tape on top of it, passed into a rolling mill. The roll bonded strip was then rapidly water quenched and coiled. Bearing components were formed from the steel backed material, and found to exhibit high fatigue strength, a low coefficient of friction and low wear rates on standard testing equipment.

Example 2

PEEK powder, 100% passing a BS 200 mesh sieve (less than 76 μ) made by the mechanical comminuting of ICI VICTREX PEEK Grade 45P, was intimately mixed with 20% by weight of ICI FLUON VX2, a 20% by volume bronze 20% by volume graphite filled PTFE moulding powder.

The mixing was accomplished in a high speed mixer.

The polymer powder was fabricated into a test bearing lining in the following manner. The backing used was 1½ mm steel strip having a 5 micron copper plated interlayer and a porous bronze layer of 11% tin/bronze (BS60 to 100 mesh sieve) ½ mm thick sintered to the copper.

Predried polymer powder was spread to a thickness of 1½ mm by means of a vibrating feed hopper onto a substrate and then heated by induction heating to a temperature of between 360° and 370° C. The blank was rolled to consolidate the powder into a continuous coherent lining. The coated blank was then rapidly cooled and formed into a bearing, having similar properties to those of Example 1.

Example 3

Granules of filled PEEK were produced as described in Example 1, and injection moulded on a conventional reciprocating screw injection moulding machine. The machine used was a Negri Bossi V7-9FA (approx. 2 oz (57 g) injection capacity), the material was found to be easy to mould into plain cylindrical bushes, 15 mm O.D.×15 mm long with 1.5 mm wall thickness, at processing temperatures areound 370° C. These again showed similar properties to the bearings produced in Example 1.

Example 4

Fine powdered polyether ether ketone made by mechanically comminuting ICI VICTREX PEEK 45P and sieving through a 200 mesh BS sieve (76 microns) was mixed with 20% by weight ICI FLUON VX 2 (20% graphite+20% bronze+60% PTFE by volume) in a high speed mixer.

The mixer was slowly fed into the hopper of a conventional screw extruder of L/D ratio of 20:1. A 4 inch wide die (10 cm), of die gap 2 mm was used and the draw down ratio was increased by increasing the haul off rate until the emerging material was of the desired porosity and thickness.

The tape produced was 500 microns thick had a bulk density of 1.7 g/cm$^3$ and a porosity varying across the tape from 30 to 36% voids. Microscopic examination showed it to be composed of fine fibres of drawn PEEK of average diameter of about 10 microns matted and fused together. The VX2 mixture was localised on the surface of, and between the fibres.

The tape was then bonded firmly to a steel backing as described in Example 1, and formed into the test bushes. The bushes were impregnated with SAE 10 oil under vacuum and submitted for testing under a wide range of operating conditions. In all cases favourable results were obtained.

Example 5

Fine powdered PEEK was intimately mixed with 10% by volume of ICI FLUON L169 (for PTFE powder) and extruded into a porous fibrous tape as described in Example 4. This time the product was of higher porosity (45-55% voids). The tape was bonded to a steel backing and formed into bushes as in Example 4. This time the bushes were vacuum impregnated with a lithium soap based grease (Shell Alvania RA) before testing as in Example 4. Again, favourable results were obtained.

Although the compositions have all been described in use as bearing materials, they are also suitable for use in other applications, for example as a structural reinforcement or, in the case of the porous material, as a filter material.

Obviously, numerous modifications and variations of the present invention are possible in the light of the above teachings. It is therefore to be understood that within the scope of the appended claims, the invention may be practised otherwise than as specifically described herein.

What is claimed as new and desired to be secured by Letters Patent of the United States is:

1. A bearing material comprising: 60 to 90% by weight of a polyether ketone having a melting temperature in excess of 330° C. and having physically intermixed therein between 10 and 40% by weight of a low friction, self-lubricating phase comprising polytetrafluoroethylene (PTFE), graphite and bronze.

2. The composition of claim 1 wherein said polyether ketone is polyetheretherketone (PEEK).

3. The composition of claim 2 wherein said bronze is a tin bronze.

4. The composition of claim 2 wherein said PEEK represents 70% to 85% of said composition by weight.

5. The composition of claim 2 wherein the weight ratios of graphite, PTFE, and bronze are 1:3:4 respectively.

6. A bearing material composition of matter comprising 2.5% graphite, 7.5% PTFE, 10% bronze and 80% PEEK by weight.

* * * * *